United States Patent
Chamayou et al.

(10) Patent No.: US 9,181,367 B2
(45) Date of Patent: Nov. 10, 2015

(54) POLYMER DEGASSING PROCESS CONTROL

(71) Applicant: Ineos Europe AG, Rolle (CH)

(72) Inventors: Jean-Louis Chamayou, Carry le Rouet (FR); Luc Girardot, Chateauneuf les Martiques (FR)

(73) Assignee: INEOS EUROPE AG, Rolle (CH)

( * ) Notice: Subject to any disclaimer, the term of this patent is extended or adjusted under 35 U.S.C. 154(b) by 0 days.

(21) Appl. No.: 14/348,953

(22) PCT Filed: Oct. 3, 2012

(86) PCT No.: PCT/EP2012/069526
§ 371 (c)(1),
(2) Date: Apr. 1, 2014

(87) PCT Pub. No.: WO2013/056979
PCT Pub. Date: Apr. 25, 2013

(65) Prior Publication Data
US 2014/0249287 A1    Sep. 4, 2014

(30) Foreign Application Priority Data
Oct. 17, 2011   (EP) .................................... 11185416

(51) Int. Cl.
*C08F 110/02*   (2006.01)
*C08F 6/00*     (2006.01)
*C08F 10/02*    (2006.01)

(52) U.S. Cl.
CPC .................................... *C08F 110/02* (2013.01)

(58) Field of Classification Search
CPC ........... C08F 10/02; C08F 110/02; C08F 6/00
USPC .................................. 528/483, 490, 498, 499
See application file for complete search history.

(56) References Cited

U.S. PATENT DOCUMENTS 5,789,501 A    8/1998  Chapman et al.
6,465,608 B1   10/2002 Witt et al.

FOREIGN PATENT DOCUMENTS

| DE | 10 2005 005 506 A1 | 8/2006 |
| EP | 0 341 540 B1 | 1/1993 |
| EP | 0 801 081 A2 | 10/1997 |
| EP | 2 172 494 A1 | 4/2010 |
| WO | WO 00/69919 A1 | 11/2000 |

*Primary Examiner* — Fred M Teskin
(74) *Attorney, Agent, or Firm* — Nixon & Vanderhye P.C.

(57) ABSTRACT

Process for operating a vertical fixed bed degasser which is continuously fed with an active polymer powder produced by a catalytic olefin polymerization process in a polymerization reactor. The polymerization conditions in the degasser are such that there is produced an additional amount of polymer corresponding to between 0.001 and 0.015 times the amount which entered the degasser. The degassing process includes introducing into the degasser a stripping gas containing principal monomer, with the temperature inside the degasser being the polymerization reactor temperature plus or minus 20° C.

11 Claims, 4 Drawing Sheets

POLYMER DEGASSING PROCESS CONTROL

This application is the U.S. national phase of International Application NO. PCT/EP2012/069526 filed 3 Oct. 2012 which designated the U.S. and claims priority to European Patent Application No. 11185416.2, filed 17 Oct. 2011, the entire contents of each of which are hereby incorporated by reference.

The present invention relates to polymer degassing process control. In particular, the present invention relates to a process for operating a vertical fixed bed polymer powder degasser.

BACKFROUND OF THE INVENTION

In a (co-)polymerization process, the monomers and comonomers if any may remain occluded in the porous (co-)polymer particles and dissolved in particular in the amorphous parts of the (co-)polymer, in particular when the comonomers are relatively heavy alpha-olefins comprising, for example, from 4 to 8 carbon atoms and which are used in particular in the manufacture of linear low-density polyethylene. In the manufacture of high-density polyethylene, a relatively high polymerization temperature and a large amount of hydrogen used as chain-limiting agent may promote secondary hydrogenation reactions, in particular forming organic compounds of low volatility, containing, for example, from 4 to 12 carbon atoms. Moreover, alkanes of relatively low volatility containing, for example, from 4 to 10 and preferably from 5 to 8 carbon atoms, may be used as inert constituents in processes for the polymerization of olefins phase with a view to improving the production. These organic compounds and alkanes of low volatility may also remain occluded and dissolved in the porous polyolefin particles. It is generally essential to remove from the (co-)polymers produced, the unconverted (co)monomers, the organic compounds and the alkanes of relatively low volatility for ecological and economic reasons, but also for safety reasons.

All these compounds constitute a load on the environment, they are capable of forming explosive mixtures in the presence of atmospheric oxygen and they adversely affect the quality of the products due to the risk of the prolongation of an uncontrolled residual polymerization outside the polymerization zone. The absence of recovering and recycling of these compounds, in particular of the unconverted (co)monomers, would have the effect of substantially increasing the price of the polyolefins.

Moreover, it is desirable to manufacture polyolefins of a quality which is stable with time irrespective of the low amounts of catalytic residues contained in the polyolefins and to avoid an inopportune and uncontrolled prolongation of a residual polymerization after transfer of the polymer out of the polymerization zone. A polyolefin is sought which is both of stable and constant quality with time and of the highest possible whiteness index.

Different degassing methods have been developed over the past decades with the dual objective of improving the reduction in the residual contents of unconverted (co)monomers and of organic compounds and alkanes of low volatility which are occluded and dissolved in the polyolefin particles and continuously producing a polyolefin of improved quality, more stable and constant with time. Most of these methods tend to favour the post-polymerisation of the residual (co) monomers in the degasser by selecting degassing conditions and a degassing medium adapted to the degassing vessel(s) configuration.

For example, U.S. Pat. No. 6,465,608 discloses the use of pure ethylene in a fluidized-bed decompression tank reactor at a temperature higher than the temperature prevailing in the upstream polymerisation reactor.

SUMMARY OF THE INVENTION

In the course of their continuous developments, and in particular towards high capacity commercial polymerisation plants, the Applicants have found that they could not operate their degassing vessel(s) configuration without developing strict control procedures. In particular, the Applicants have discovered that the prior art degassing conditions methods used for favouring the post-polymerisation of the residual reactive polymer powder components could not be applied to their vertical fixed bed degassers because it could either impact the final properties of the dried polymer or even block the degasser (e.g. due to the melting of the resin), especially with a polymer powder exhibiting a certain residual polymerisation activity.

Thus, the present invention relates to a process for operating a vertical fixed bed degasser which is continuously fed with an active polymer powder produced by a catalytic olefin polymerisation process in a polymerisation reactor wherein
  the polymerisation conditions in the degasser are such that there is produced an additional amount of polymer corresponding to between 0.001 and 0.015 times the amount which entered the degasser,
  the degassing process comprises the introduction into said degasser of a stripping gas comprising from 5 to 60% by volume of principal monomer, preferably ethylene, and the degassing conditions are selected such that the temperature inside the degasser is maintained within a range of temperatures comprised between the polymerisation reactor temperature plus or minus 20 degrees centigrade.

For the purpose of the present invention and appended claims, the principal monomer is referred to as the monomer having the highest concentration in mol % in the polymerisation reactor.

Exemplary vertical fixed bed degasser used in the present invention may be cylindrical vessel having a relatively tall vertical section, a cover or head at the top, sloped sides or conical shape at the bottom with an opening for polymer powder discharge. The polymer powder to be degassed may enter the vessel at the top, while the stripping gas may be introduced to the vessel towards the bottom, for example in the sloped bottom sides. Flow is preferably counter current between the stripping gas and polymer powder in the vessel. In a preferred embodiment, the stripping gas leaves the vertical degassing vessel through an opening at the top, while the degassed powder leaves at the bottom of the said vessel.

Preferably, the diameter (D) of the degassing vessel ranges from 2 to 10 meters; its length (L) is preferably chosen to achieve a residence time comprised between 30 to 180 minutes, i.e. a time sufficient for an efficient degassing of the polymer powder. Preferred LID ratios may range from 0/5 to 8. The operating pressure of the degassing vessel is preferably comprised between 0.1 and 0.3 MPa.

Internals may also be employed in the degassing vessel, such as a distributor plate for introducing the stripping gas, an inverted cone reducing channelling of the polymer powder, and so on; the present invention is preferably used with degassing vessels which contain such internals.

The stripping gas may be introduced at one or more locations/elevations in the degasser vessel.

BRIEF DESCRIPTION OF THE DRAWINGS the invention is further described with reference to the accompanying drawings, in which.

DETAILED DESCRIPTION OF THE INVENTION

Figure 1:
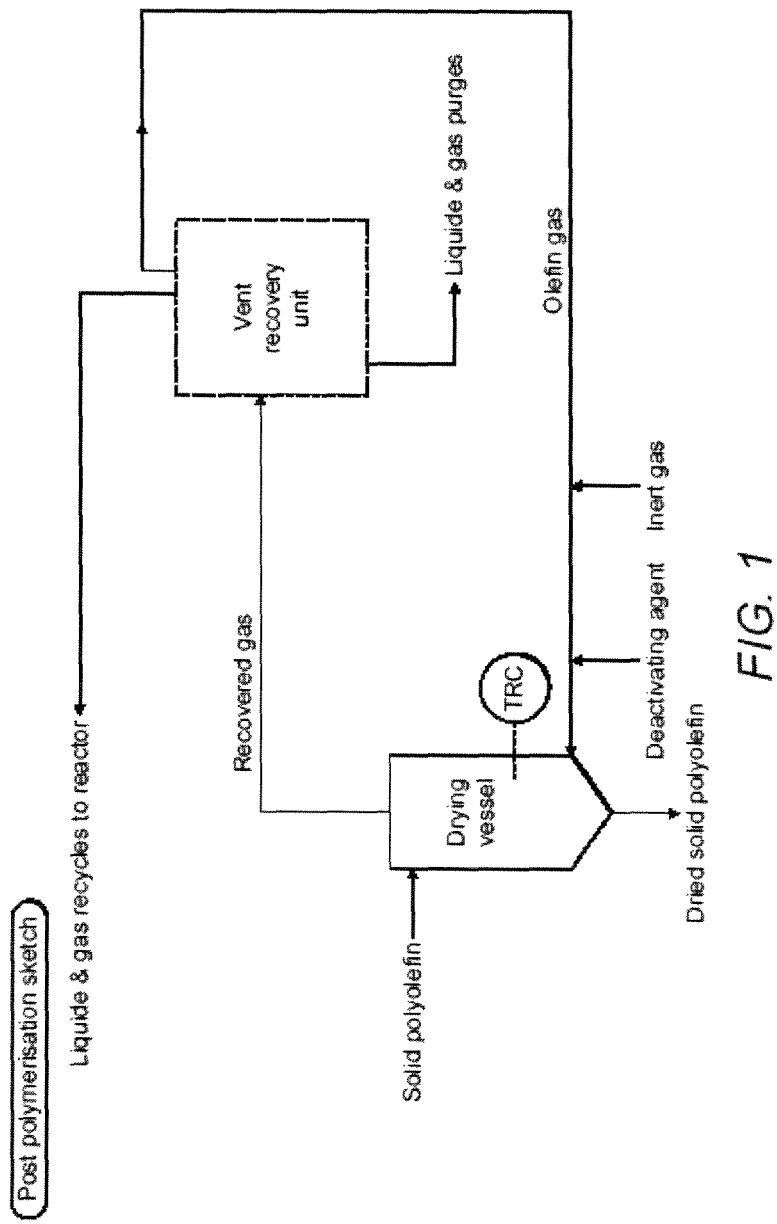
FIG. 1 represents an illustration of process features and equipment according to the present invention.

FIG. 1 represents an illustration of process features and/or equipment according to the present invention. The main equipment is the vertical fixed bed degasser ("drying vessel" in FIG. 1), the entry line(s) for the active polymer powder ("solid polyolefin" in FIG. 1), the stripping gas entry line(s) ("olefin gas" in FIG. 1) and the temperature control ("TRC" in FIG. 1).

FIG. 1 represents as well additional alternative and/or preferred embodiments according to the present invention; said corresponding process features and/or equipment will be disclosed in more details hereafter.

Thus, according to the present invention, the polymerisation conditions in the degasser are such that there is produced an additional amount of polymer corresponding to between 0.001 and 0.015 times the amount which entered the degasser, preferably between 0.003 and 0.015. A typical calculation of said residual polymerisation activity which is controlled in the degasser is given in the examples. Another way of describing this residual polymerisation activity can be given by referring to the active polymer powder which exhibits a residual average productivity ratio comprised between 0.001 and 0.015, preferably between 0,003 and 0.015. For the purpose of the present invention and appended claims, the said residual average productivity ratio means the ratio between the average productivity in the degasser and the average productivity in the polymerisation reactor. An example of measurement is given in the examples. Any other appropriate measurement method can also be used, e.g. a mass balance calculation. For example, for an ethylene polymerisation process, the average productivity in a vessel can be defined as the amount of polyethylene produced in the said vessel (kgPE)/weight of catalyst in the vessel (kg)]. For example, the polyethylene produced can be calculated by the ethylene consumption. For example, the productivity can also be measured by measuring the residual catalyst content on powder.

A critical characterizing feature of the present invention is that the degassing conditions are selected such that the temperature inside the degasser is maintained in a range of temperatures comprised between the polymerisation reactor temperature plus or minus 20 degrees centigrade, preferably plus or minus 15 degrees centigrade. The said temperature measurement point is preferably located at the highest temperature location prevailing in the degassing vessel. For example, in our preferred configuration—with the introduction of the stripping gas at the bottom of the degassing vessel—said temperature is preferably measured at the bottom of the fixed bed degasser. However, e.g. in an alternative configuration where the stripping gas is introduced at a higher elevation of the degassing vessel, the temperature measurement point will be moved correspondingly.

The degassing conditions according to the present invention will be selected in order to favor the postpolymerisation in the degasser whilst preferably maintaining the operating temperature below the sintering temperature of the polymer powder. The man skilled in the art knows that polyolefin particles do not have a precise melting temperature but that they can be characterised by a temperature, called sintering temperature, at which they begin to soften and have a tendency to stick together. For example, according to Peter Comso et al (Part.Charact./1984, pp 171-177) this minimum sintering temperature is the temperature at which a large drop in surface viscosity of the particles occurs. Several methods have been recorded by the authors, for determining the minimum sintering temperature of the particles. A known method consists in performing fluidisation experiments using the particles and correlating the minimum fluidisation velocity as a function of temperature. At the minimum sintering temperature a discontinuity appears in the correlation, as a result of the formation of agglomerates of particles. As a variant, it is possible to correlate the pressure drop in the fluidisation apparatus as a function of temperature, using a gas velocity slightly higher than the minimum fluidisation velocity; when sintering occurs, a sharp decrease in pressure drop is observed. Another method proposed by the authors of the cited article consists in determining the elongation of a column of particles under a specific load as a function of the temperature.

The man skilled in the art knows very well how to measure a polymerisation reactor temperature. For clarity and simplicity the polymerisation reactor temperature can advantageously be considered as equal to the set point of the polymerisation temperature control loop. Said temperature control loop is usually implemented into a DCS and controls the average temperature inside the reactor usually by adjusting one or more cooling means.

It was unexpected that the degassing operations according to the present invention allowed the Applicants to overcome the problems of polymer powder quality and/or degasser blockage previously encountered with active polymer powder treated in fixed bed degassers. Whilst other control process methods could alternatively or additionally be used like, the temperature control according to the present invention proved to be simple and perfectly adequate and therefore most appropriate to the vertical fixed bed reactor configuration.

Alternatively or additionally, the degassing process according to the present invention may comprise a control based on the principal monomer content in the degassing vessel e.g. a control based on the measurement of the ethylene (or principal monomer) content at the top of the degassing vessel and/or based on the consumption of principal monomer in the degasser, preferably based on the measurement of the ethylene partial pressure in the stripping gas and/or on the ethylene molar content in such stripping gas.

Alternatively or additionally, the degassing process according to the present invention may comprise a control based on the measurement of the content of deactivating agent at the top of the degassing vessel and/or calculation of catalytic activity at any point in the degasser.

Alternatively or additionally, the degassing process according to the present invention may comprise a control based on the total pressure at the top of the degassing vessel.

Alternatively or additionally, the degassing process according to the present invention may comprise a control based on the polymer residence time inside the degassing vessel.

In addition to the maintenance of the degasser temperature within its specified range of values, the Applicants have also found advantageous to control the degassing conditions such that the flowability of the polymer powder entering/exiting the degasser is such that the difference between the value of the Hausner ratio of the polymer powder exiting the degasser and the value of the Hausner ratio of the polymer powder entering the degasser is comprised between +−0.03, and/or the ratio of melt index of the polymer powder entering into the degasser to the one exiting the degasser is comprised between 0.9 and 1.1, and/or the difference between the density of the polymer powder entering into the degasser and the one exiting the degasser is comprised −2 and +2 (minus 2 and 2) (expressed in kg/m3).

For the purpose of the present invention and appended claims, the flowability of the polymer powder entering/exiting the degasser is preferably such that the difference between the Hausner ratio of the polymer powder exiting the degasser and the value of the Hausner ratio of the polymer powder entering the degasser is comprised between +−0.03. Said Hausner ratio is calculated by the formula $$H = \frac{\rho_T}{\rho_B}$$

Where $\rho_B$ is the freely settled bulk density of the polymer powder, and $\rho_T$ is the tapped bulk density of the polymer powder, both being measured by following the same appropriate measurement method known to the man skilled in the art.

Thus, according to a preferred embodiment of the present invention, the ratio of melt index of the polymer powder entering into the degasser to the one exiting the degasser is comprised between 0.9 and 1.1. For the purpose of the present invention and appended claims, the melt index ratio means the ratio between the melt index of the polymer powder entering into the degasser and the melt index of the polymer powder exiting the degasser, both being identically measured by following the same appropriate measurement method. For example, the melt index can be measured at 190° C. and at a 5 kg load according to ASTM standard D 1238-Condition P (1986).

Thus, according to a preferred embodiment of the present invention, the difference between the density of the polymer powder entering into the degasser and the one exiting the degasser is comprised between −2 and +2 (minus 2 and 2) (expressed in kg/m3).For the purpose of the present invention and appended claims, the density difference means the difference between the density of the polymer powder entering into the degasser and the density of the polymer powder exiting the degasser, both being identically measured by following the same appropriate measurement method (expressed in kg/m3). For example, the density can be measured according to ISO standard 1183 (1987).

Thus, according to the present invention, a stripping gas comprising from 5 to 60% by volume of ethylene (or of the principal monomer) is introduced in the degassing vessel, preferably at its bottom. Said stripping gas usually comprises an inert, preferably nitrogen. The principal monomer and the nitrogen preferably represent at least 35% by volume of the stripping gas. The operating pressures in the degasser will preferably be comprised between 0.1 and 0.3 MPa. Advantageously, the stripping gas also comprises a polymerisation deactivating agent, e.g. water. For example, the control of the degassing conditions may advantageously be additionally based on the control of the concentration of deactivating agent—e.g. water; said control of the concentration of deactivating agent can advantageously be made in the stripping gas itself; alternatively, it can be made at the inlet of the degasser and/or by analyzing the gas exiting the degasser which should ideally not contain (or only traces of) the said deactivating agent.

Thus, an embodiment of the present invention relates to a process for operating a vertical fixed bed degasser which is continuously fed with an active polymer powder produced by a catalytic olefin polymerisation process in a polymerisation reactor wherein the polymerisation conditions in the degasser are such that there is produced an additional amount of polymer corresponding to between 0.001 and 0.015 times the amount which entered the degasser, the degassing process comprises the introduction into said degasser of a stripping gas comprising at least one polymerisation deactivating agent and from 5 to 60% by volume of principal monomer, preferably ethylene, and the concentration of polymerisation deactivating agent is controlled such that the temperature inside the degasser is maintained in a range of temperatures comprised between the polymerisation reactor temperature plus or minus 20 degrees centigrade.

The man skilled in the art knows how to select the most appropriate deactivating agent(s) depending on the catalyst system used in the polymerisation process. For example, oxygen, carbon monoxide, carbon dioxide, water, or any mixture thereof, can be used as deactivating agent(s). According to a preferred embodiment of the present invention, water is the selected deactivating agent.

This additional alternative and preferred embodiment according to the present invention is also represented in FIG. 1 wherein at least one polymerisation deactivating agent ("deactivating agent" in FIG. 1) is added to the stripping gas introduced in the degasser. Whilst it is not a preferred embodiment according to the present invention, it will be obvious for the man skilled in the art that the stripping gas and the deactivating agent can be introduced separately in the degasser.

As depicted in FIG. 1, the gas exiting the degasser is introduced in a vent recovery unit. The recovery unit comprises refrigeration, compression and purification stages which allow separating the gas exiting the degasser in a gas/liquid stream which can be recycled in the upstream operations and the stripping gas stream (consisting essentially in a mixture of inert gas and principal monomer gas) which can then be used in the degasser. In a preferred embodiment according to the present invention, the vent recovery unit also comprises a membrane separation unit which allows to control the content of ethylene in the stripping gas; indeed, the Applicants have discovered that the reduction of the ethylene content in the stripping gas used in the degasser was highly beneficial under some circumstances in order to fulfill the conditions set for the present invention. Such control of the principal monomer content in the stripping gas can equally be performed by controlling the pressure and/or the temperature during the flash taking place in the recovery unit.

The active polymer powder treated in the degassing process of the present invention comes from a catalytic olefin polymerisation process performed in a polymerisation reactor; said polymerisation process is preferably a continuous polymerisation reaction process. Said polymerisation reaction can take place in any appropriate reactor, e.g. a gas phase reactor, a gas/liquid phase reactor or a slurry reactor.

When the olefin polymerisation reaction is in slurry phase, the reactor is preferably a slurry loop reactor. Slurry phase polymerisation of olefins is well known wherein an olefin monomer and an olefin comonomer are polymerised in the presence of a catalyst in a diluent in which the solid polymer product is suspended and transported. Liquid full loop reactors are particularly well known in the art and are described for example in U.S. Pat. Nos. 3,152,872, 3,242,150 and 4,613,484.

Polymerisation is typically carried out at temperatures in the range 50-125 degrees C. and at pressures in the range 1-100 bara. The catalyst used can be any catalyst typically used for olefin polymerisation such as chromium oxide, Ziegler-Natta or metallocene-type catalysts, as long as the polymer powder entering the degassing vessel satisfies the residual average productivity ratio as defined hereinabove.

The product slurry comprising polymer and diluent, and in most cases catalyst, olefin monomer and comonomer can be discharged intermittently or continuously, optionally using concentrating devices such as hydrocyclones or settling legs to minimise the quantity of fluids withdrawn with the polymer.

The loop reactor is of a continuous tubular construction comprising at least two, for example four, vertical sections and at least two, for example four, horizontal sections. The heat of polymerisation is typically removed using indirect exchange with a cooling medium, preferably water, in jackets surrounding at least part of the tubular loop reactor. The volume of the loop reactor can vary but is typically in the range 20 to 120 cubic meters.

When polymerisation reaction is in the gas phase, the method may be carried out in a stirred and/or gas fluidised bed. Gas phase polymerisation of a mixture of polymerisable olefin to produce normally solid polymer substances using a quench-cooled, gas-phase polymerisation reactor containing a sub-fluidised particulate bed of polymerised olefin has been described in a number of patents including: U.S. Pat. Nos. 3,957,448, 3,965,083 and 3,971,768. These US Patents describe polymerisation processes and apparatus in which polymer is formed from gaseous olefin in horizontal stirred-bed vessels.

According to the most preferred embodiment of the present invention, the polymer powder treated according to the present invention comes from a gas phase fluidised-bed reactor. Such processes are well-known, and examples include EP 0 475 603, EP 1 240 217, EP 1 484 344 and EP 0 855 411.

In such processes, the particles of polymer being formed are maintained in the fluidised state by virtue of a reaction gas mixture containing the monomer(s) to be polymerised travelling in a rising stream. The polymer thus manufactured in powder form is generally drained from the reactor in order to keep the bed of fluidised polymer particles at a more or less constant volume. The process generally employs a fluidisation grid which distributes the reaction gas mixture through the bed of polymer particles and which acts as a support for the bed in the event of a cut in the flow of the rising gas. The reaction gas mixture leaving at the top of the fluidised-bed reactor is recycled to the base of the latter under the fluidisation grid by means of an external circulation conduit.

The polymerisation of the olefins is an exothermic reaction. The reaction mixture comprising the olefins to be polymerised is generally cooled by means of at least one heat exchanger arranged on the outside of the reactor before being recycled.

Liquid, especially but not limited to liquid condensed from the cooled reaction mixture during recycle, may be injected into the reaction zone. Vaporisation of the liquid in the reaction zone provides the effect of cooling directly in the reaction zone.

The method of the invention is particularly suitable for very large industrial reactors; in accordance with one embodiment of the present invention, the reactor used makes it possible to produce quantities of polymer of more than 3000 kg/h, preferably more than 10,000 kg/h. The process of the invention is further particularly suitable for high space time yields (in terms of weight of polymer produced per unit volume of reactor space per unit time) in commercial gas fluidised bed reactors; consequently, according to a further embodiment of the present invention, space time yields are higher than 25 $kg/m^3/h$, preferably higher than 50 $kg/m^3/h$, more preferably higher than 80 $kg/m^3/h$. The Space Time Yield (STY) expressed in $[kg/(m^3 \times h)]$ is well known and represents the weight of polymer produced per unit of time and per unit of reactor volume. The weight of polymer production per unit of time can also advantageously be calculated as the average steady (co)monomers feed rate (ignoring therefore the slight fluctuations due to (co)monomers losses, e.g. purges).

The principal olefin according to the present invention is ethylene or propylene, preferably ethylene. Ethylene or propylene represents preferably more than 50% by weight of the polymer produced.

Comonomer olefins are preferably selected from olefins having 3 to 12 carbon atoms. Suitable comonomer olefins are propylene, 1-butene, 1-hexene, 4-methyl-1-pentene and 1-octene. Preferably, the principal olefin is ethylene and the comonomer is 1-butene, 1-hexene or 1-octene.

The reaction mixture may also comprise one or more inert compounds, especially inert gases such as nitrogen, and/or one or more saturated hydrocarbons such as ethane, propane, butane, pentane and hexane.

The method according to the present invention may be used to treat a wide variety of polymer products, e.g. linear low density polyethylene (LLDPE), especially based on copolymers of ethylene with 1-butene, 1-hexene or 1-octene. This method is particularly suitable for the production of very low density polyethylene (VLDPE). A further suitable polyethylene product is high density polyethylene (HDPE), especially copolymers of ethylene with a small portion of higher alpha olefin, for example, 1-butene, 1-pentene, 1-hexene or 1-octene.

The method is particularly suitable for polymerising olefins in the gas phase at an absolute pressure of between 0.5 and 6 MPa and at a temperature of between 30° C. and 130° C. For example, for LLDPE production the temperature is suitably in the range 75-100° C. and for HDPE the temperature is typically 80-115° C. depending on the activity of the catalyst used and the polymer properties desired.

The total pressure in the gas phase polymerisation reactor is most preferably between 1.5 and 3 MPa.

The method of the present invention may be applied to polymerisation processes using any suitable polymerisation catalyst, including Ziegler-Matta type catalysts, chromium oxide type catalysts, and metallocene type catalysts, as long as the polymer powder entering the degassing vessel satisfies the residual average productivity ratio requirement as defined hereinabove.

The polymerisation may therefore be carried out, for example, in the presence of a catalyst of Ziegler-Matta type comprising at least one transition metal in combination with a cocatalyst comprising an organometallic compound, for example an organoaluminium compound. The catalyst essentially comprises an atom of a transition metal selected from the metals of groups IV to VI of the periodic classification of the elements, such as titanium, vanadium, chromium, zirconium or hafnium, optionally a magnesium atom and a halogen atom. The catalyst may be supported on a porous refractory oxide such as silica or alumina or may be combined with a solid magnesium compound, such as the chloride, the oxide, the hydroxy chloride or an alcoholate of magnesium. By way of example, mention may be made of the catalysts described in the patents U.S. Pat. No. 4,260,709, EP 0 598 094, EP 0 099 774, EP 0 175 532and U.S. Pat. No. 6,410,475. Additional examples for silica-supported Ziegler catalysts include those described in Patents WO 93/09147, WO 95/13873, WO 95/34380, WO 99/05187 and U.S. Pat. No. 6,140,264. The catalyst can be used as it is or optionally in the form of a coated catalyst or prepolymer containing, for example, from $10^{-5}$ to 3, preferably from $10^{-3}$ to $10^{-1}$, millimoles of transition metal per gram of polymer; it can be used together with a cocatalyst or activator, e.g. an organometallic compound of a metal from groups I to III of the Periodic Classification of the Elements, such as, for example, an organoaluminium compound. It is also possible to use a catalyst complexed by a metal selected from those of group VIII of the periodic classification of the elements, such as, for example, nickel, iron or cobalt. By way of examples, mention may be made of those described in Patent Application WO 98/27124 or WO 98/2638. It is also possible to use catalysts based on platinum or palladium as the transition metal; complexes of this type are described, for example, in the Patent WO 96/23010.

The polymerisation may thus also be carried out in the presence of a chromium oxide type catalyst. Said chromium oxide type catalysts (or Phillips catalyst) are particularly preferred in the present invention, due to the residual average productivity ratio requirement. Examples of chromium oxide catalysts are typically those comprising a refractory oxide support which is activated by a heat treatment advantageously carried out at a temperature of at least 250° C. and at most equal to the temperature at which the granular support begins to sinter and under a non-reducing atmosphere and preferably an oxidising atmosphere. This catalyst can be obtained by a great number of known process, in particular by those according to which, in a first stage, a chromium compound, such as a chromium oxide, generally of formula CrO3, or a chromium compound which can be converted by calcination into chromium oxide, such as, for example, a chromium nitrate or sulphate, an ammonium chromate, a chromium carbonate, acetate or acetylacetonate, or a tert-butyl chromate, is combined with a granular support based on refractory oxide, such as, for example, silica, alumina, zirconium oxide, titanium oxide or a mixture of these oxides or aluminum or boron phosphates or mixtures in any proportion of these phosphates with the above mentioned oxides. In a second stage, the chromium compound thus combined with the granular support is subjected to a so-called activation operation by heat treatment in a non-reducing atmosphere and preferably an oxidising atmosphere at a temperature of at least 250° C. and at most that at which the granular support begins to sinter. The temperature of the heat treatment is generally between 250° C. and 1200° C. and preferably between 350 and 1000° C. Such catalyst preferably contains from 0.05 to 5%, more preferably from 0.1 to 2%, by weight of chromium; it can contain, in addition to the chromium, from 0.1 to 10% of titanium in the form of titanium oxide and/or fluorine and/or aluminium, in particular in the form of aluminium oxide; it can be used as it is or optionally in the form of a coated catalyst or prepolymer containing, for example, from $10^{-5}$ to 3, preferably from $10^{-3}$ to $10^{-1}$, millimoles of chromium per gram of polymer. The chromium oxide catalysts may be used together with a cocatalyst or activator, e.g. an organometallic compound of a metal from groups I to III of the Periodic Classification of the Elements, such as, for example, an organoaluminium compound. Examples of catalysts can be found, for example, in EP 0 275 675, EP 0 453 116, or WO 99/12978.

The method of the present invention can also be applied to a polymerisation process in which the catalyst is a metallocene-type catalyst.

With regards to particular metallocene-type catalysts, mention may be made, by way of example, of those corresponding to the formula

where L is a bulky ligand; A is a leaving group, M is a transition metal and m and n are such that the total valency of the ligand corresponds to the valency of the transition metal. The ligands L and A may be bridged. L is generally a ligand of the cyclopentadienyl type.

Examples of metallocene catalysts of this type are described in U.S. Pat. Nos. 4,530,914, 5,124,418, 4,808,561, 4,897,455, 5,278,264, 5,278,119, 5,304,614, and EP 0 129 368, EP 0 591 756, EP 0 520 732, EP 0 420 436, WO 91/04257, WO 92/00333, WO 93/08221, WO 93/08199.

It is also possible to use with advantage the metallocene-based catalyst systems as described in U.S. Pat. Nos. 4,871,705, 4,937,299, 5,324,800, 5,017,714, 5,120,867, 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP 0 561 476, EP 0 279 586, EP 0 594 218, WO 94/10180 and WO 2006/085051.

Mention may also be made of the Patents WO 92/00333, WO 94/07928, WO 91/04257, WO 94/03506, U.S. Pat. Nos. 5,057,475, 5,096,867, 5,055,438, 5,198,401, 5,227,440, 5,264,405, EP-A-0 420 436, U.S. Pat. Nos. 5,604,802, 5,149,819, 5,243,001, 5,239,022, 5,276,208, 5,296,434, 5,321,106, 5,329,031, 5,304,614, WO 93/08221, WO 93/08199 and EP 0 578 838. The preferred transition metal compounds of the catalyst are those of group 4, in particular zirconium, titanium and hafnium.

The metallocene catalyst may also be represented by the general formula (Cp)mMRnR'p, where Cp is a ring of the cyclopentadienyl type, M is a transition metal of group 4, 5 or 6; R and R' may be selected from halogens and hydrocarbyl or hydrocarboxyl groups; m=1-3, n=0-3, p=0-3 and the sum m+n+p equals the oxidation state of M; preferably, m=2, n=1 and p=1.

The metallocene catalyst may be also represented by the general formula

where Me is a transition metal of group 4, 5 or 6, at least one C5 R'm is a substituted cyclopentadienyl, each R', which may be identical or different, is hydrogen, an alkyl, alkenyl, aryl, alkylaryl or arylalkyl radical having 1 to 20 carbon atoms, or two carbon atoms linked together to form part of a substituted or unsubstituted ring having 4 to 20 carbon atoms, R" is a radical containing one or more or a combination of carbon, germanium, silicon, phosphorus or nitrogen atoms which bridges two rings (C5 R'm), or which bridges one ring (C5 R'm) to M, when p=0, x=1, else "x" is always 0, each Q, which may be identical or different, is an alkyl, alkenyl, aryl, alkylaryl or arylalkyl radical having 1 to 20 carbon atoms, a halogen or an alkoxide, Q' is an alkylidene radical having 1 to 20 carbon atoms, s is 0 or 1, and when s is 0, m is 5 and p is 0, 1 or 2 and when s is 1, m is 4 and p is 1.

The metallocene catalysts are generally used with an activator or cocatalyst. Examples which may be mentioned include alumoxane and/or ionic or neutral ionising activators, or compounds such as pentafluorophenyltri(n-butyl)ammonium tetraborate or the boric metalloid precursor of trisperfluorophenyl, which ionises the neutral metallocene compound. Compounds of this type are described in EP 0 570 982, EP 0 520 732, EP 0 495 375, EP 0 426 637, EP 0 500 944, EP 0 277 003, EP 0 277 004, U.S. Pat. Nos. 5,153,157, 5,198,401, 5,066,741, 5,206,197 and 5,241,025, and WO 94/07928. Catalyst combinations may also be used, for example those described in U.S. Pat. Nos. 5,281,679, 4,701,432, 5,124,418, 5,077,255 and 5,183,867.

Other examples of metallocene catalysts are described in Patents EP 0 593 083, U.S. Pat. Nos. 5,317,036, 4,937,217, 4,912,075, 4,935,397, 4,937,301, 4,914,253, 5,008,228, 5,086,025, 5,147,949, 4,808,561, 4,897,455, 4,701,432, 5,238,892, 5,240,894, 5,332,706, WO 95/10542, WO 95/07939, WO 94/26793 and WO 95/12622.

Preferably, the metallocene comprises
A) an inert support,
B) a group 4-10 metal complex corresponding to the formula:

where M is a metal of one of groups 4 to 10 of the Periodic Table of the Elements, Cp is an anionic ligand group,
Z is a divalent moiety linked to Cp and linked to M, comprising boron or an element of group 14 of the Periodic Table of the Elements, and further comprising nitrogen, phosphorus, sulphur or oxygen;
X is a neutral conjugated diene ligand group having up to 60 atoms, or a dianionic derivative, and
C) an ionic cocatalyst capable of converting the metal complex into an active polymerisation catalyst.

Examples of cocatalysts are described in U.S. Pat. Nos. 5,132,380, 5,153,157, 5,064,802, 5,321,106, 5,721,185 and 5,350,723. Mention may also be made of the complexes described in WO 96/28480 and WO 98/27119.

The catalyst may be used in the form of a prepolymer prepared beforehand during a prepolymerisation step from catalysts described above. The prepolymerisation may be carried out by any process, for example a prepolymerisation in a liquid hydrocarbon or in gas phase in accordance with a batchwise, semicontinuous or continuous process.

The catalyst or the prepolymer may be introduced in the reactor continuously or discontinuously, preferably continuously.

The non-limiting examples which follow illustrate the present invention. The Applicants have developed a model which has been validated respectively by their industrial experience. Said model is based on the combination of a kinetic model and a heat and mass balance in a multitude of homogeneous zones of the vertical fixed bed degasser according to the present invention. The model predicts the degasser temperature profile as depicted hereafter.

The model has been applied to a high density polyethylene grade having a density of 953 and a MI5 of 1. Said polymer grade was produced in a fluidized bed reactor in the presence of a silica supported chromium oxide catalyst as follows:
Chromium catalyst productivity reactor: 2500 g/g;
Production rate: 50t/h;
Reactor temperature: 102° C.;
Reactor pressure: 24 bara;
Fluidised bed reactor—gas phase composition:
  Ethylene: 8.5 bars
  Hydrogen: 3 bars
  Hexene: 0.0008 bars
  Pentane: 3.7 bars
The vertical fixed bed degasser has the following geometry/characteristics:
  Diameter: 3.9 m
  Powder Height: 7 m
  Degasser L/D; 1.8
Powder residence time in vertical degasser: 45 min
Degasser top pressure: 0.13 MPa
Stripping gas flow: 2250 Nm3/h
Stripping gas Temperature: 30° C.
For this example, the productivity ratio calculation can be made as follows=(Z−Y)/(Y−X) wherein X, Y and Z are the flow rates respectively of catalyst (X) at the reactor inlet, of polymer at degasser inlet (Y) and of polymer at degasser exit (Z).
QPEdegasser (polyethylene produced in degasser)=(stripping gas flow Nm3/h)×(ethylene concentration in stripping gas mol %)×(weight fraction of ethylene from the stripping gas reacted in the degasser)×28.05/22.414
X=production rate/catalyst productivity
Y=production rate
Z=Y+QPEdegasser
For example 2,
QPEdegasser=2250×0.215×1×28.05/22.414=605.39 kg/h
X=50,000/2500=20 kg/h
Y=50,000 kg/h
Z=50605.39 kg/h
→(Z−Y)/(Y−X)=605.39/49,980=0.0121
Results:

| Run | Ethylene concentration stripping gas (% mol) | Degasser bottom temperature (° C.) | Productivity ratio | Temperature difference (Polymerisation/ Degasser) | Density degasser outlet (kg/m3) | MI degasser outlet | Comments |
|---|---|---|---|---|---|---|---|
| 1 | 16.0 | 107.5 | 0.009 | +5.5 | 953.0 | 0.99 | 94.5% by weight Ethylene reacted |
| 2 | 21.5 | 113.3 | 0.012 | +11.3 | 953.0 | 0.99 | All Ethylene reacted |
| C3 | 29.2 | 124.6 | 0.016 | +22.6 | 953.1 | 1.01 | All Ethylene reacted Powder melting temperature reached |

Figure 2:
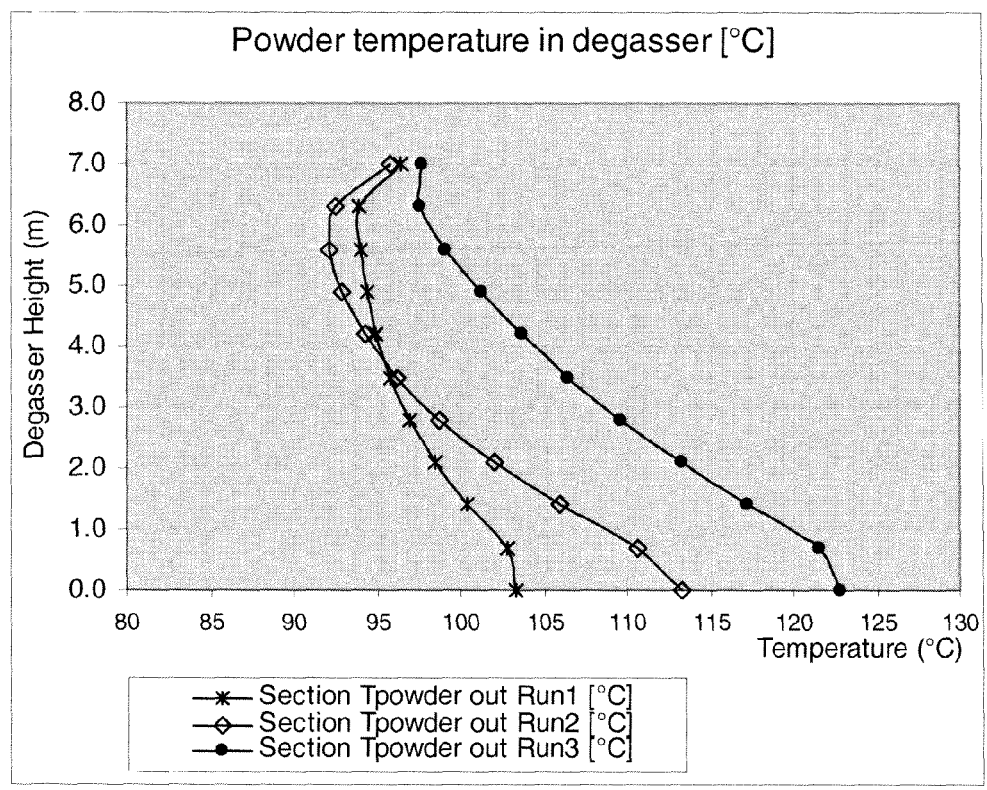
FIG. 2 is a graph of degasser height vs powder temperature in the degasser.

The graph with chromium catalyst is attached as FIG. 2

This model confirms the existence of a hot zone at the bottom of the vertical fixed bed degasser.

In the above example, runs 1 and 2 lead to a satisfactory degassing of the polymer powder, including favorable post-polymerisation; the run 3 (comparative) illustrates that melting of the polymer powder can occur if the degassing conditions are not controlled according to the present invention; in this run 3, there was a temperature difference of more than 20 degrees centigrade between the polymerisation temperature and the highest temperature point in the degasser.

The same model has been used for a polymer powder—obtained from a metallocene catalyzed gas phase polymerisation process as per the detailed conditions indicated hereunder.

The catalyst corresponds to the one prepared in example 2 of WO2005019275.
Product: Metallocene PE (density=918, MI2.16=1.2)
Metallocene catalyst productivity reactor: 5000 g/g
Production rate: 50t/h
Reactor temperature: 80° C.
Reactor pressure: 24 bara
Fluidised bed reactor—gas phase composition:
  Ethylene: 12.45 bars
  Hydrogen: 0.04 bars
  Hexene: 0.0433 bars
  Pentane: 3.07 bars
The vertical fixed bed degasser has the following geometry/characteristics:
  Diameter: 3.9 m
  Powder Height: 7 m
  Degasser LID: 1.8
Powder residence time in vertical degasser: 49 min
Degasser top pressure: 0.13 MPa
Stripping gas flow: 2250 Nm3/h
Stripping gas Temperature: 30° C.
Results:

| Run | Ethylene concentration stripping gas (% mol) | Degasser bottom temperature (° C.) | Productivity ratio | Temperature difference (Polymerisation/Degasser) | Density degasser outlet (kg/m3) | MI degasser outlet | Comments |
|---|---|---|---|---|---|---|---|
| C4 | 27.0 | 57.3 | 0.0 | −21.7 | 918.0 | 1.2 | No post polymerisation |

Figure 3:
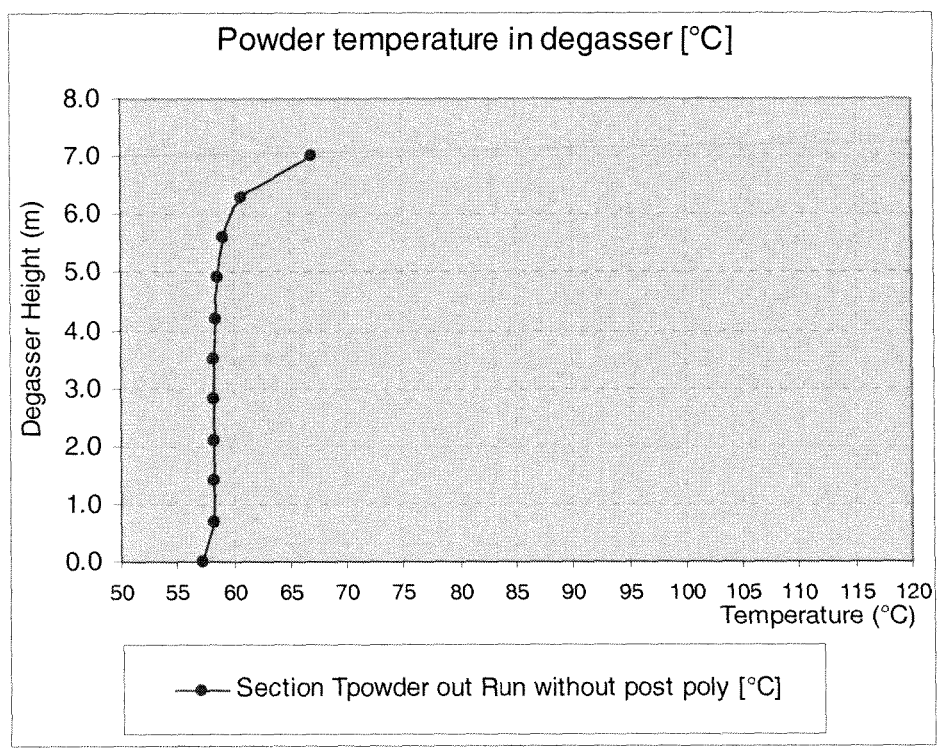
FIG. 3 is another graph of degasser height vs powder temperature in the degasser.
Figure 4:
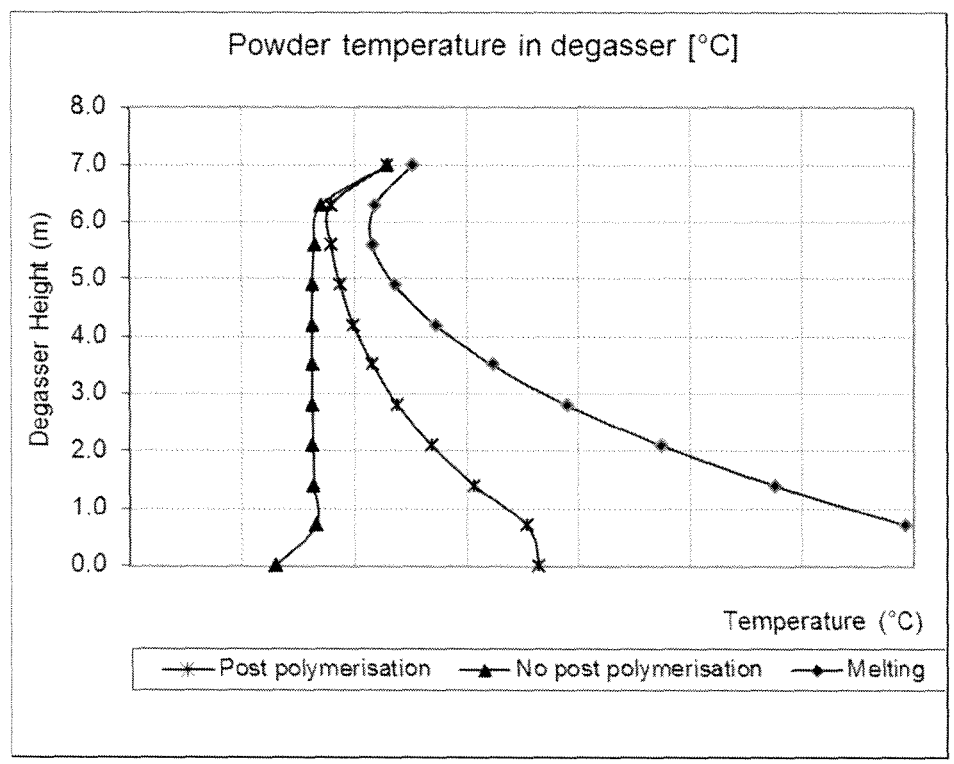
FIG. 4 is a graph showing three different types of typical temperature curves in a fixed bed degasser

The corresponding graph—attached as FIG. 3—clearly shows that no post polymerisation takes place in the degasser. FIG. 4 is a generic graph which shows the three different types of typical temperatures curves in a fixed bed degasser. The curve in the middle corresponds to the present invention.

The invention claimed is:

1. Process for operating a vertical fixed bed degasser which is continuously fed with an active polymer powder produced by a catalytic olefin polymerisation process in a polymerisation reactor wherein
  the polymerisation conditions in the degasser are such that there is produced an additional amount of polymer corresponding to between 0.001 and 0.015 times the amount which entered the degasser,
  the degassing process comprises the introduction into said degasser of a stripping gas comprising from 5 to 60% by volume of principal monomer, and
  the degassing conditions are selected such that the temperature inside the degasser is maintained within a range of temperatures comprised between the polymerisation reactor temperature plus or minus 20 degrees centigrade, and further wherein at least one of the following applies:
  a) the degassing process comprises the introduction into said degasser of at least one polymerization deactivating agent and the selection of the degassing conditions comprises the control of the content of the said deactivating agent, or
  b) the gas exiting the degasser is introduced in to a vent recovery unit which comprises refrigeration, compression and purification stages which allow separating the gas exiting the degasser into a gas/liquid stream which can be recycled in the upstream operations and the stripping gas stream which can then be used in the degasser, the stripping gas stream consisting essentially of a mixture of inert gas and principal monomer gas.

2. Process according to claim 1 wherein the degassing process comprises the introduction into said degasser of at least one polymerization deactivating agent and wherein the deactivating agent is selected from oxygen, carbon monoxide, carbon dioxide, water, or any mixture thereof.

3. Process according to claim 2 wherein the deactivating agent is water.

4. Process according to claim 1 wherein the degassing process comprises a control based on one or more of the following:
  i) the principal monomer content in the degassing vessel,
  ii) the total pressure at the top of the degassing vessel, and
  iii) the polymer residence time inside the degassing vessel.

5. Process according to claim 2 wherein the degassing process comprises a control based on one or more of the following:
  i) the principal monomer content in the degassing vessel,
  ii) the total pressure at the top of the degassing vessel, and
  iii) the polymer residence time inside the degassing vessel.

6. Process according to claim 1 wherein the catalyst used in the upstream polymerisation reactor process is a metallocene catalyst, a Ziegler-Natta catalyst, or a chromium oxide catalyst.

7. Process according to claim 6 wherein the catalyst is a chromium oxide catalyst.

8. Process according to claim 6 wherein the catalyst is a Ziegler-Natta catalyst.

9. Process according to claim 1 wherein the gas exiting the degasser is depleted in principal monomer before its recycling as stripping gas.

10. Process according to claim 1 wherein the principal monomer is ethylene or propylene.

11. Process according to claim 10 wherein the principal monomer is ethylene.

* * * * *